United States Patent [19]
Huse

[11] 4,407,087
[45] * Oct. 4, 1983

[54] METHOD FOR ATTACHING SNELLS TO A FISHING LINE, AND AN APPARATUS FOR CARRYING OUT THE METHOD

[75] Inventor: Per Huse, Haslum, Norway

[73] Assignee: O. Mustad & Søn A/S, Oslo, Norway

[*] Notice: The portion of the term of this patent subsequent to Jul. 1, 1998 has been disclaimed.

[21] Appl. No.: 231,567

[22] Filed: Feb. 4, 1981

[30] Foreign Application Priority Data

Mar. 3, 1980 [NO] Norway .................................. 800598

[51] Int. Cl.³ .............................................. A01K 91/00
[52] U.S. Cl. .......................................... 43/4; 43/27.4; 43/44.83
[58] Field of Search .............. 43/4, 27.4, 44.83, 44.84, 43/44.85, 54.5 A; 29/809, 818, 235, 453

[56] References Cited

U.S. PATENT DOCUMENTS

| | | | |
|---|---|---|---|
| 3,872,530 | 3/1975 | Festerling | 29/809 X |
| 4,149,336 | 4/1979 | Huse | 43/44.84 |
| 4,170,820 | 10/1979 | Klose | 29/809 X |
| 4,277,905 | 7/1981 | Huse | 43/4 |

Primary Examiner—Nicholas P. Godici
Assistant Examiner—M. Jordan

Attorney, Agent, or Firm—Ladas & Parry

[57] ABSTRACT

A method for attaching detachable snells to a fishing line while the line system is being set out from a moving vessel at sea. The snell and the line have cooperating coupling members consisting of a peg with stop studs rotatably attached to the line and a radially elastic ring attached to the snell, the ring being detachably fastened to the peg by being pressed down into a locked position behind the stop studs. The line is drawn through an apparatus having a peg orienting means, and the pegs pass a discharge opening on a ring magazine where each peg is brought into engagement with the central opening of a discharged ring and carries the ring along with it to pass between two converging surfaces whereby the ring is pressed down into a locked position on the peg. The converging surfaces consist of a pressure surface for the ring provided with a guide/clearance groove for the peg, and a backstop surface for the peg. The discharge opening is arranged at the forward edge of the pressure surface at the entrance to the converging surfaces and is adjacent to a ring feed regulator in which the primary plane of the ring forms an acute angle relative to the path of advancement for the peg such that the peg enters the ring and carries it along, as mentioned above.

5 Claims, 2 Drawing Figures

METHOD FOR ATTACHING SNELLS TO A FISHING LINE, AND AN APPARATUS FOR CARRYING OUT THE METHOD

BACKGROUND OF THE INVENTION

The invention relates to a method for attaching detachable snells to a fishing line while the line system is being set out from a moving vessel at sea, as recited in the preamble of the appurtenant method claim. Further, the invention comprises an apparatus for carrying out the method, as recited in the preamble of the appurtenant apparatus claim.

Attempts have been made previously to connect a fishing line and snells during the actual setting of the line in the sea from a moving vessel. In U.S. Pat. No. 3,533,184, a snell is shown with a snap-on clamp at one end thereof intended to be snapped onto a line between two stop means, or optionally onto a snell-formed stop means provided on the line. This snap-on clamp can be connected and disconnected either manually or mechanically. However, the patent does not show an apparatus for an automatic attachment of snells on the line as the line is being set out.

From the applicant's Norwegian Pat. No. 138,976, cooperating coupling members are known for attaching a snell to a line as recited in the introduction of the description, and from the applicant's Norwegian patent application No. 78.2033, an apparatus is known for attaching detachable snells to a line while the line is being set from a moving vessel at sea. This apparatus comprises a guide member, pivotable back and forth, for advancing rings with attached snells, one at a time, from a magazine to a point at which a peg on the running line is brought into engagement with the ring, the peg being retained in a holder on a slide member which is pulled forward by the peg to the said point, wherein the ring, during the further movement of the peg and slide member, is pushed down into a locked position on the peg, and the peg holder on the slide and the peg are subsequently disconnected as the slide abuts against a fixed stop means such that the peg becomes detached from the slide abuts against a fixed stop means such that the peg becomes detached from the slide. The slide is then pulled back by means of an attached spring which has become extended during the advancement operation and is thus ready to receive a new peg on the line. The slide, via a transfer member, for example, a stay pivotally attached to the slide, is connected to the feed member for the ring, such that the advancement of rings from the magazine is synchronized with the movement of the peg forward to the connection point. The pivotable ring advancing member can also be provided with a spring for returning it to its starting position. This apparatus has a number of parts which move back and forth, and these may sometimes move sluggishly or lock up under the conditions in which the apparatus is used at the fishing grounds, and the costs of producing it are also relatively large.

SUMMARY OF THE INVENTION

The object of the present invention is to provide a method for attaching detachable snells to a fishing line while the line system is being set out from a moving vessel at sea, wherein the coupling of the snell to the line occurs without the use of members moving back and forth, and an apparatus for carrying out the method which does not have components that move back and forth, thus providing a reliable, robust and reasonably-priced apparatus.

This is obtained according to the invention through the characteristic features disclosed in the characterizing clauses of the appurtenant method claim and apparatus claim, respectively.

According to the method of the invention, the fishing line, carrying pegs oriented in the same direction, is pulled past a discharge opening for a magazine containing the rings such that the end of each peg is brought into engagement with the central opening of a ring as the rings are discharged. The peg carries the ring along with it, and the ring is pushed further down onto the peg into a locked position thereon in that the ring and peg are guided between two converging surfaces, one of said surfaces forming a backstop for the peg while the second surface forces the ring down onto the peg as the line with the peg and ring passes between the said converging surfaces. One surface is provided with a guide groove providing clearance for the peg.

The apparatus of the invention is thus characterized by two surfaces converging in the direction of movement for the line and having a guide/clearance groove for the pegs in one surface, and in that the above-mentioned orientating and guide means for the pegs is arranged upstream of the inlet opening to said converging surfaces. A ring magazine is disposed with its discharge opening at the marginal edge of one surface at the entrance to the converging surfaces. A feed regulator is arranged at the discharge opening of the magazine and comprises a stop means for discharging the rings one at a time. The path of advancement for the line and thus for the pegs forms an acute angle in relation to the peripheral plane of the rings as they are being discharged, such that the end of the peg can pass beneath an edge of the ring and come into contact with the inside of the ring so as to carry it along.

The invention will be described in further detail in the following with reference to two embodiment examples which are illustrated schematically in the accompanying drawings, where

BRIEF DESCRIPTION OF THE INVENTION

Figure 1:
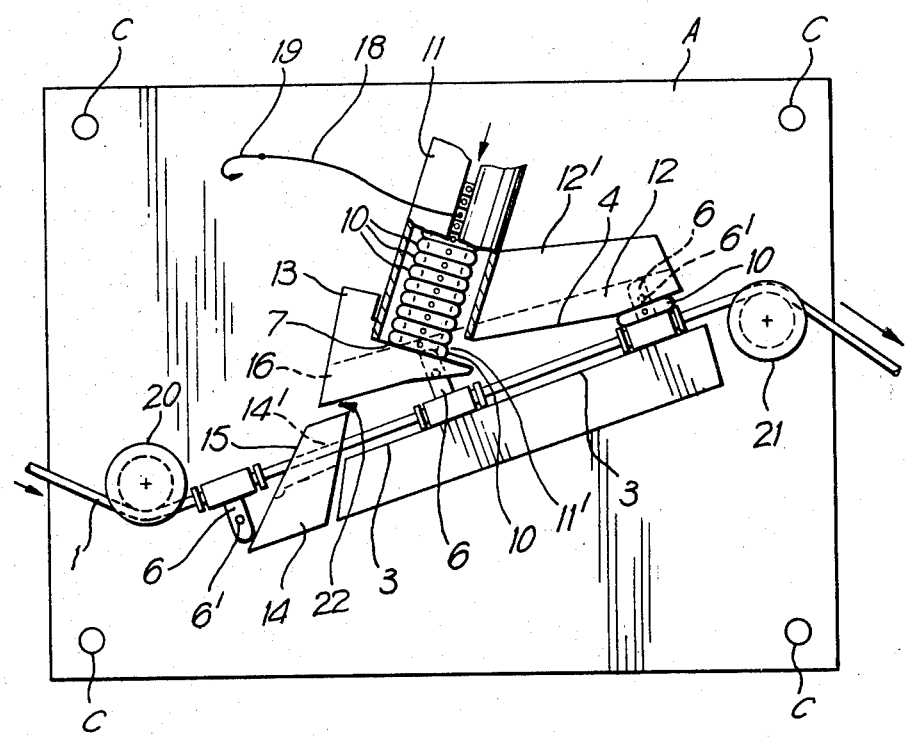
FIG. 1 shows one embodiment of the apparatus, seen from the side and in partial cross section.

FIG. 1 shows an apparatus constructed in the simplest manner possible for carrying out the method of the invention. The apparatus comprises a plate or stand A to which the various components are fastened in a suitable manner; the plate can be attached to the appropriate place on the vessel between a storage drum (not illustrated) for the line 1 and a discharging member (not shown) for feeding the line into the sea. On the plate A, the following components are provided, listed in sequence according to the direction of movement for the line 1 through the apparatus:

an orientating and guide means 14, 13 for orienting the pegs 6 which are rotatably attached to the line 1 into a specific position, and for guiding the pegs 6 in said position forward to a discharge opening 11' in a spring-loaded magazine 11 for rings 10 with snells 18 which are discharged from the magazine, one at a time, to come into contact with a feed regulator 7 consisting, for example, of a stop surface spaced a distance exterior of the discharge opening 11'. The discharged ring 10 is oriented in such a manner on the stop surface 7 that its peripheral plane forms an acute angle relative to the direction of advancement for the line 1, such that the peg 6 can pass beneath the edge of the ring 10 to come into contact with its inside surface, and the ring 10 will be carried further on the peg 6 to pass between two converging surfaces 3, 4. The line 1 with the peg 6 is supported by the surface 3, which can optionally be provided with a guide groove, while the ring 10 which is being drawn along the surface 4 becomes forced down onto the peg 6 past locking studs 6' on the middle section thereof. The surface 4 is provided with a groove 12 for the peg 6 such that the latter has enough clearance to run freely through the converging surfaces 3 and 4. The line 1, with its pegs 6 carrying rings 10 with snells 18 to which hooks 19 with bait (not shown) are attached, is thereafter guided out to the sea via suitable members (not illustrated).

The line 1, owing to the forward movement of the vessel, will be unwound from the above-mentioned storage drum and will pass through the above-discussed apparatus for attaching snells to the line, and then be set out in the sea.

At the inlet and outlet ends of the apparatus, optional guide members for the line 1 may be arranged, for example, in the form of pulleys 20 and 21.

Figure 2:
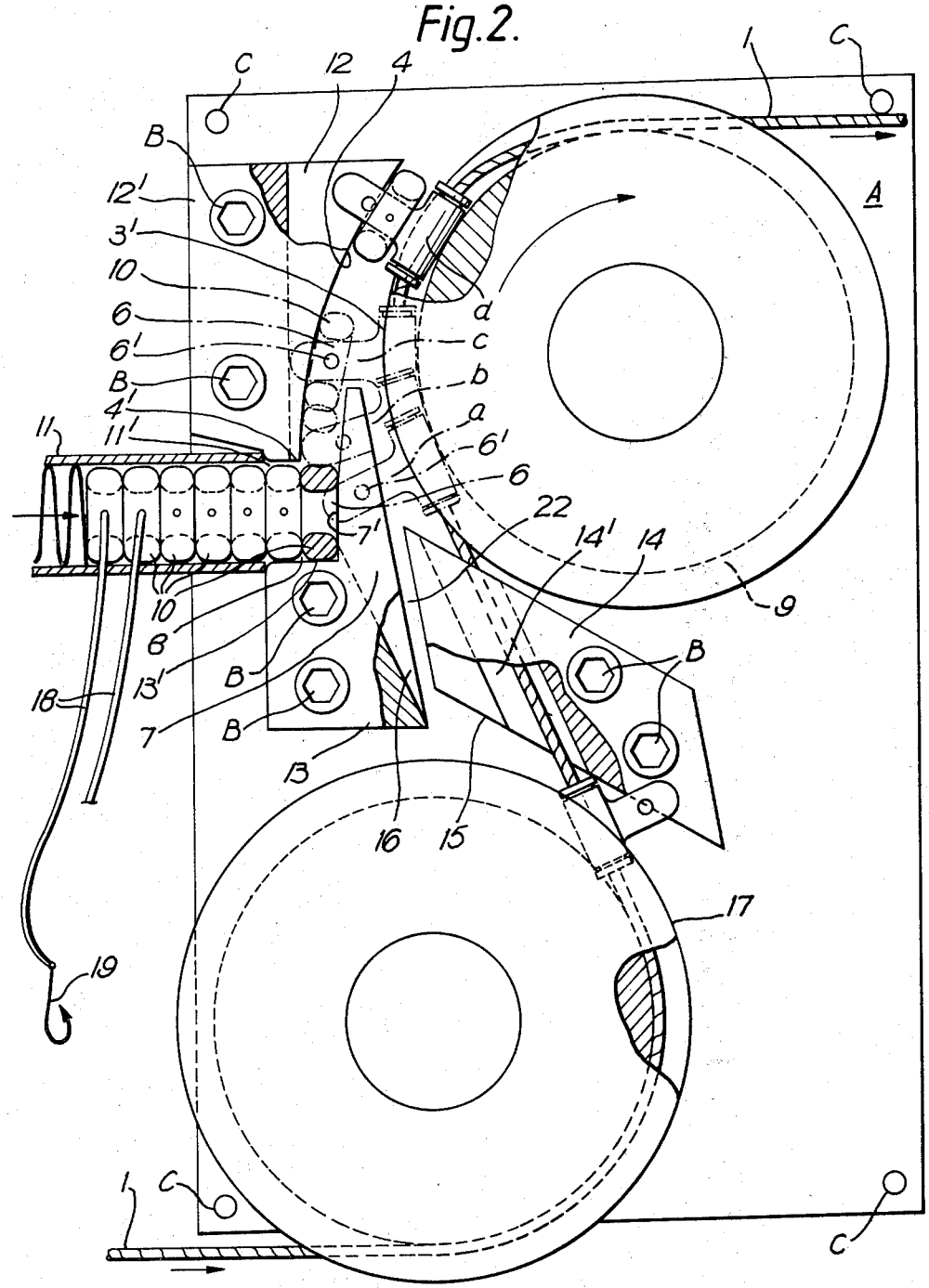
FIG. 2 shows a second embodiment of the apparatus, seen from the side and in partial cross section.

A preferred embodiment of the apparatus is shown in FIG. 2 and also comprises a stand or plate A on which the components of the apparatus are mounted.

The converging surfaces 3 and 4 in this example constitute, respectively, a rotatable disk 3' with a peripheral groove 9 for receiving the line 1 with pegs 6, and spaced a distance from the periphery of the pulley 3', a curved surface 4. The curved surface 4, as was the case for the surface 4 in FIG. 1, is provided with a groove 12 to permit the pegs 6 to pass beneath the rings. At the end of the groove 12 which faces toward the direction of advancement for the line 1, i.e., at the opening defining the entrance between the converging surfaces 3', 4, a ring insertion opening 8 is arranged at the edge of the surface 4, said opening being defined by a body 12' which comprises the surface 4 and by one side surface 13' on a body 13 which also includes a projection 7' which constitutes the stop surface for the ring 10 on the feed regulator 7. The ring magazine 11, by means of fastener means which are not illustrated, is arranged so as to be aligned with the ring insertion opening 8 such that the magazine's spring pushes the rings into contact against the feed regulator 7. In the body 13, a groove 16 is provided which faces toward and cooperates with a groove 14' in the body 14 which constitutes the orientating and guide means for the pegs 6 as discussed in connection with FIG. 1. Arranged upstream of the body 14 is a pulley 17 for guiding the line 1 with pegs 6, this pulley corresponding to the pulley 20 in FIG. 1. In the embodiment example shown in FIG. 2, the pulley which constitutes the one surface 3' of the converging surfaces also acts as a guide pulley for the line 1 in the same way as the pulley 21 in FIG. 1.

FIG. 2 clearly shows the various phases a, b, c, and d by which the ring 10 is inserted onto the peg 6.

In phase a, the peg is guided beneath one edge of the ring 10 and has come into contact with the interior of the ring, such that as the peg advances further, the ring will be pulled away from the ring insertion opening 8 along the support surface 7' on the feed regulator and be carried on the peg to pass beneath the curved surface 4 which converges toward the other curved surface, constituted by the peripheral groove 9 in the pulley 3'. The peg 6, which is supported in the groove 9, is guided into the groove 12 in the surface 4 while at the same time the surface 4 begins to press the ring 10 further down onto the peg 6 as shown in phase b. Phase c shows the ring being forced further down over the opposing locking studs 6' on the peg, and phase d shows the ring 10 pushed all the way down onto the peg, past the locking studs, into a locked position.

By means of the apparatus discussed above and the method on which it is based, the rings 10 on the snells 18 are inserted onto the pegs 6 on the line without any form of back-and-forth movement of the components of the apparatus.

In the embodiment shown in FIG. 1, there are no movable parts apart from the illustrated guide pulleys 20 and 21 at the inlet and outlet ends of the apparatus. In the embodiment according to FIG. 2, only one movable part apart from the pulley 17 at the inlet end of the apparatus is found, namely, the disk 3' which is set in rotation by the line with pegs 6 which is pulled over the disk as the line is being set out.

The various components are advantageously fastened to the plate A by means of screws B as shown in FIG. 2. In addition, the plate A is provided with fastener holes C for attaching it to a suitable support member.

Because the orientating and guide means comprises two separate parts, i.e., the body 15 with the peg-orienting edge 15 and the guide groove 14' and a second body 13 with a guide groove 16 aligned with the guide groove 14', a slot 22 is provided between said bodies 13 and 14 through which the line 1 can be laid sideways into the guide, or be removed from the guide at the start or end of the line setting operation.

Having described my invention, I claim:

1. A method of attaching detachable snells to a fishing line while the line system is being set out from a moving vessel at sea, the snell and the line having cooperating coupling members consisting of a peg rotatably attached to the line and having opposing stop studs at the middle section thereof, and a radially elastic ring attached to one end of the snell which is detachably fastened to the peg by being pressed down over the peg past the stop studs into a locked position behind the studs, the line with its pegs oriented in the same direction being pulled through a device for connecting the coupling members, characterized in that the pegs are guided past a discharge opening on a magazine for the rings such that an end of each peg is brought into engagement with the opening of a discharged ring and carries the ring along with it, the ring being pressed down further into a locked position on the peg in that the ring and the peg are guided between two converging surfaces, a pressure surface for the ring having a guide/clearance groove for the peg and a backstop surface for the peg.

2. An apparatus for carrying out the method according to claim 1, the apparatus comprising guides for the line and, listed in sequence in the direction of movement for the line, an orienting/guide means for the pegs, a ring storage magazine with a means for bringing the peg and ring into mutual engagement, and connecting means for the ring and the peg, characterized by two surfaces converging in the direction of movement for the line, namely, a pressure surface, for the rings which has a guide/clearance groove for the pegs provided therein and a backstop surface for the pegs, the ring storage magazine being arranged with its discharge opening at the forward edge of the pressure surface at the entrance to the converging surfaces, a feed regulator being provided at the discharge opening for the magazine comprising a stop means for discharging one ring at a time, and the path of advancement for the line and thus for the pegs forming an acute angle in relation to the primary plane of the discharged ring such that the end of the peg can pass beneath an edge of the ring and come into contact with the interior of the ring to carry it along.

3. An apparatus according to claim 2, characterized by a ring guide channel defined by the forward edge of the pressure surface and a surface on the feed regulator, said ring guide channel being intended for connection with the discharge opening on the ring magazine.

4. An apparatus according to claim 3, characterized in that the backstop surface constitutes a rotatable disk with a peripheral groove for receiving the line with pegs, and that the pressure surface is concavely curved.

5. An apparatus for attaching detachable snells to a fishing line while the line system is being set out from a moving vessel at sea, the snell and the line having cooperating coupling members consisting of a peg rotatably attached to the line and having opposing stop studs at the middle section thereof, and a radially elastic ring attached to one end of the snell which is detachably fastened to the peg by being pressed down over the peg past the stop studs into a locked position behind the studs, the line with its pegs oriented in the same direction being pulled through a device for connecting the coupling members, which apparatus comprises guides for the line and, listed in sequence in the direction of movement for the line, an orienting/guide means for the pegs, a ring storage magazine with a means for bringing the peg and ring into mutual engagement, and connecting means for the ring and the peg, characterized by two surfaces converging in the direction of movement for the line, namely, a concavely curved pressure surface for the ring which has a guide/clearance groove for the pegs provided therein and a backstop surface for the pegs, which backstop surface constitutes a rotatable disk with a peripheral groove for receiving the line with pegs, the ring storage magazine being arranged with its discharge opening at the forward edge of the pressure surface at the entrance to the converging surfaces, a feed regulator being provided at the discharge opening for the magazine comprising a stop means for discharging one ring at a time, the pressure surface with its forward edge constituting a body fastened to the stand of plate (A) of the apparatus, and the ring feed regulator constituting a body mounted on the plate or stand (A) and comprising an edge which together with the forward edge of the pressure surface defines a ring guide channel which opens out toward the stop means which forms a right angle with the edge of the ring feed regulator body, the said ring guide channel being intended for connection with the discharge opening on the ring magazine, and the path of advancement for the line and thus for the pegs forming an acute angle in relation to the primary plane of the discharged ring such that the end of the peg can pass beneath an edge of the ring and come into contact with the interior of the ring to carry it along.

* * * * *